Sept. 19, 1933.　　H. L. WHITTEMORE ET AL　　1,927,478
PROVING RING
Filed Aug. 24, 1929　　3 Sheets-Sheet 1
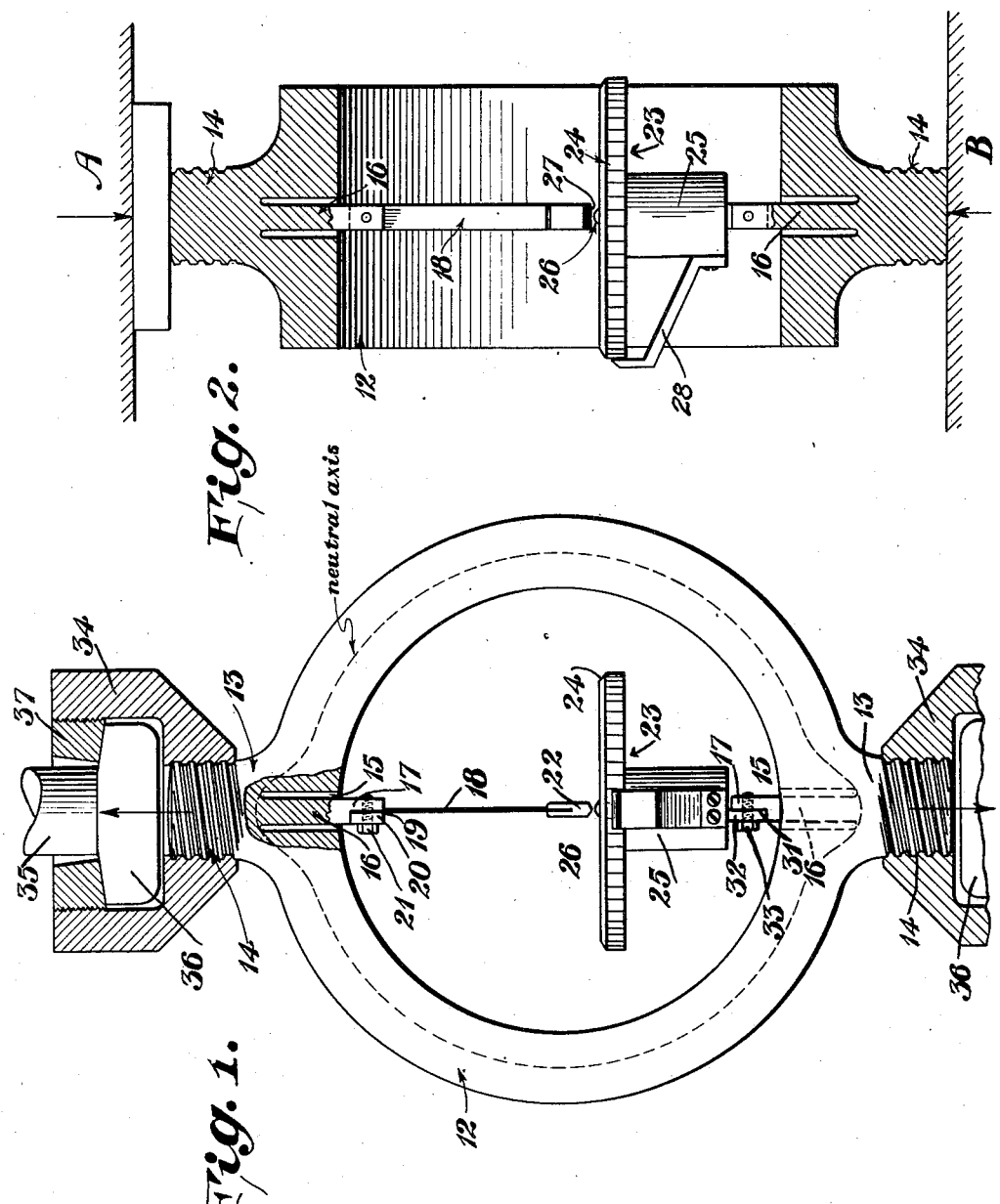
Inventors
H. L. Whittemore.
By S. N. Petrenko.
Andrew T. Dupont
their Attorney Sept. 19, 1933.   H. L. WHITTEMORE ET AL   1,927,478
PROVING RING
Filed Aug. 24, 1929    3 Sheets-Sheet 2

Inventors
H. L. Whittemore
S. N. Petrenko
Andrew T. Dupont
their Attorney

Sept. 19, 1933.     H. L. WHITTEMORE ET AL     1,927,478
PROVING RING
Filed Aug. 24, 1929     3 Sheets-Sheet 3
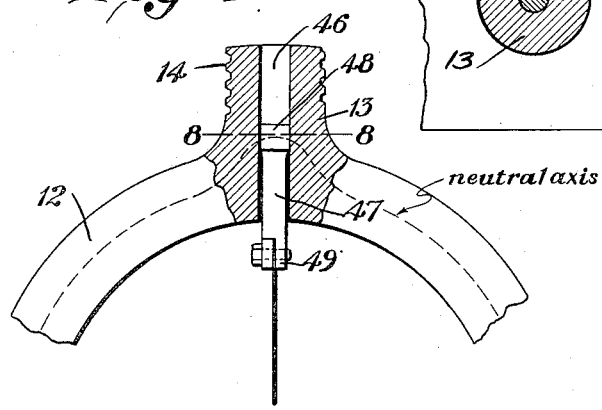
Fig. 7.
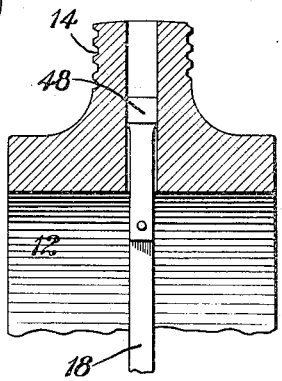
Fig. 8.
Fig. 9.
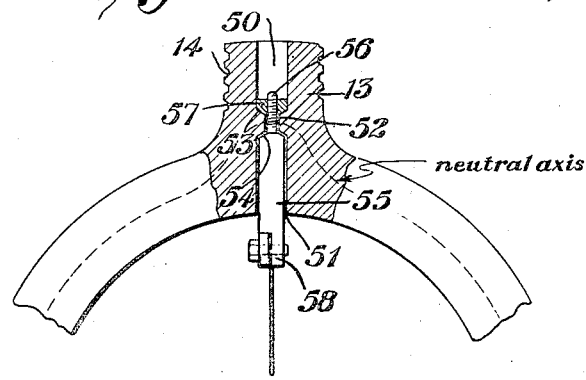
Fig. 10.
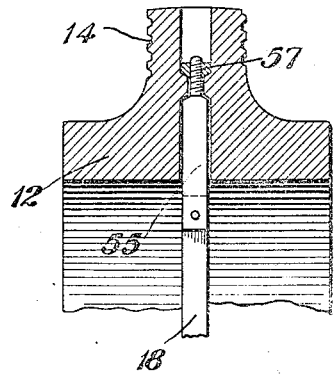
Fig. 11.

Patented Sept. 19, 1933

1,927,478

UNITED STATES PATENT OFFICE 1,927,478

PROVING RING

Herbert L. Whittemore and Serge N. Petrenko, Washington, D. C.; Alexander I. Krynitsky executor of said Serge N. Petrenko, deceased Application August 24, 1929. Serial No. 388,191

14 Claims. (Cl. 265—63)

Our invention relates to a device adapted to be used for calibrating new testing machines and determining the errors in the loads indicated by machines having had considerable use.

One object of our invention is to provide a proving instrument which will be accurate, rugged, simple in design, that will retain a constant calibration after use, disassembly or lapse of time, and that will be easy to operate.

Another object of our invention is to produce a proving ring which will give accurate readings of the load, the design and construction of this ring being such that load readings obtained in service by different observers, will differ from the correct loads obtained by loading the proving ring with dead weights, only by negligible amounts.

A further object of our invention consists in attaching the instruments for measuring the deflections of a standard proving ring under load, at a point in the ring where there is little or no change in stress when the ring is loaded and unloaded, so as to minimize or eliminate errors caused by the mounting for the indicating instruments.

Still another object of our invention lies in providing our proving ring with integral bosses or projections to which the loads or forces are applied.

A further object of our invention consists, generally, in improving the device disclosed and claimed in U. S. Patent No. 1,648,375, granted to us on November 8, 1927.

With these and other objects in view, our invention consists in the features of construction and method of operation set forth in the following specification and illustrated in the appended drawings wherein:

Figure 1 is a front elevation, with parts in section, of an instrument embodying our invention;

Figure 2 is a sectional elevation of the proving ring shown in Figure 1 taken at right angles;

Figure 7 is a further modification of our invention;

Figure 8 is a section along line 8—8 of Figure 7;

Figure 9 is a section of Figure 7 at right angles thereto;

Figure 10 is still another embodiment of our invention; and,

Figure 11 is a section of Figure 10 at right angles thereto.

Figure 3:
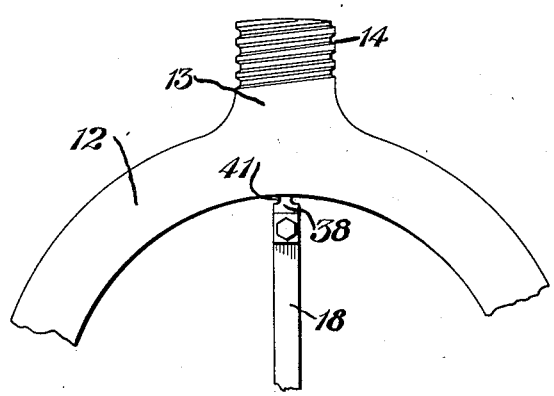
Figure 3 is a fractional showing illustrating a modified proving ring.

Referring more particularly to the drawings wherein similar reference characters are applied to similar parts, 12 indicates a ring made of hardened steel and provided at diametrically opposite points with integral projections or bosses 13, having external threads thereon, as at 14, for a purpose to be explained later. Adjacent to each of the bosses 13, the ring 12 is cut away at 15, Figures 1 and 2, the metal thus removed leaving a cylindrical groove beginning at the inner periphery of the ring and extending to approximately the neutral axis of the ring. A central cylindrical portion 16, whose axis coincides with that of the bosses 13, is thus formed opposite each of the said bosses, and is provided with an extension 17 protruding within the ring 12.

A vibratory reed 18, having the general shape of a flat spring, is mounted in a cut away portion 19 of the upper extension 17 and is secured thereto by means of the washer 20 and cap screw 21, in such manner that the axis of the reed coincides with the line along which loads are applied to the ring.

At its lower extremity the reed 18 bears a small weight 22 attached to the free end of the reed by any suitable means.

Diametrically opposite the vibratory reed 18 is mounted a micrometer designated, generally, at 23. The dial 24 carries at its center the spherical contact member 26 adapted to cooperate with the edge 27 of the vibratory reed 18. Inasmuch as this micrometer is of the same general type as that described in our aforementioned Patent No. 1,648,375, it is not thought to be necessary to describe it in detail, except to state that when the micrometer dial 24 is rotated the contact member 26 is raised or lowered.

The dial 24 is graduated into divisions, each of which may correspond to a change in elevation of contact member 26 of, for example, 1/4000 of an inch.

An index 28 cooperates with the micrometer dial 24 to permit of readings being taken of the various positions of the contact member 26. The index 28 is mounted on the micrometer casing 25.

The micrometer is rigidly attached to the lower extension 17 of the lower cylindrical portion 16 provided in the ring 12. For this purpose, the lower extension 17 has a part cut away, as at 31, and the micrometer casing 25 has an integral mounting plate 32 coacting with the remaining portion of the extension 17 and secured thereto by means of the cap screw 33, or any other suitable means.

The method of operation of the device thus far described is as follows:

The instrument is placed in the position shown in Figure 1 between the heads of the testing machine, it being assumed, in this figure, that tensile forces are applied to the ring.

Sleeve members 34 are threaded on each one of the bosses 14 and pulling bars 35 having enlarged heads 36 are placed in the hollow of each respective sleeve member 34. Bushings 37 are then placed about the bars 35 adjacent heads 36 and are threaded interiorly of the sleeve members 34, as shown. It will be understood that although only the connecting means between the upper pulling bar 35 and the upper boss 14 are shown, the lower pulling bar is identically secured to the lower boss 14 of ring 12. The upper pulling bar 35 is secured to the one head of the machine while the lower pulling bar 35 is secured to the other head of the machine.

The operator deflects the vibratory reed 18 and releases it, thus causing it to vibrate. While the reed is vibrating, the operator turns the micrometer dial 24 until a buzzing sound indicates that the weight 22 is touching the spherical contact member 26 as the former vibrates. If the micrometer is properly adjusted for a reading, the buzzing sound will continue for several seconds before the reed 18 ceases to vibrate.

Different loads are then applied to the ring 12, and a reading corresponding to each load is taken on the micrometer 23 after adjustment thereof, as explained above.

When thus loading the ring in such manner that the stress at no point thereof exceeds the elastic limit of the material of the ring, the deflection of the vertical diameter of the ring has been found to be proportional to the load applied. The relation between the load applied and the deformation obtained may be expressed by the equation $P = Cn$, where P is the load applied to the instrument, C represents the calibration constant of the instrument, and $n$ represents the deformation of the instrument expressed in divisions of the dial micrometer. It has been found in practice that the calibration constant C does not change with lapse of time, nor after disassembling and reassembling the instrument.

If loads which are accurately known have been applied to the ring and the corresponding readings of the micrometer recorded, the proving ring may then be used to calibrate any testing machine or to determine the error in the load readings thereof.

The difference between the dial reading under the known load and the dial reading for the same load as indicated by the testing machine to be calibrated is a measure of the error of the testing machine. This difference multiplied by the constant C of the instrument gives the error in kilograms, or other load units.

In our aforementioned U. S. patent, special clamping means is used for the purpose of mounting the vibratory reed and the micrometer on the ring. It has been found that proving rings having the measuring device attached to the ring by yokes, or other similar members, the deformation of which depends greatly upon the manner in which the forces are applied to the ring, do not have a constant deflection for a given load. In order to overcome this defect, the clamping means shown in our prior patent has been done away with and the reed and micrometer are now directly attached to integral portions of the ring, which are subjected to low stresses when the ring is deformed under load. These are the portions 16, to the upper one of which the reed 18 is securely fixed, while the micrometer 23 is fastened to the lower one.

In Figure 1, the neutral axis of the ring is indicated in dotted lines, and it will be seen that it assumes the shape of a circle whose radius is equal to half the sum of the outer and inner radii of the ring 12. This circle, however, is somewhat deformed where it meets the vertical axis through the bosses 14 due to the increase of material at these points, so that it follows a curve at these points approximating that shown in Figure 1.

Theoretically, when the ring 12 is subjected to a load, there are no stresses at the neutral axis while tensile stresses exist at one side thereof and compressive stresses at the other side, depending on whether the load is one of tension or compression. It is clear, therefore, that if the instrument for measuring deflections is attached at the neutral axis to a portion depending therefrom, the readings will be accurate since they will indicate true deflections of the ring proper. Therefore, this result is obtained in mounting the measuring instrument on the portions 16 of the ring, which portions do not receive any stresses when the ring is loaded, due to the fact that there is a discontinuity of material through the annular openings 15 cut in the material of the ring 12.

Inasmuch as both upper and lower projections 16 are similar, it is possible to interchange the location of the reed 18 and of the micrometer 23 without affecting the results.

It will further be understood that although our proving ring has been described above, by way of example, as being deformed by tensile forces, it may, also, if desired, be deformed by compressive forces.

When thus used in compression, our proving ring 12 is placed between the heads A and B of the machine and the load is applied directly to the bosses 14, as shown in Figure 2. The reed 18 and micrometer 23 are mounted on the portions 16, as previously described.

Figure 4:
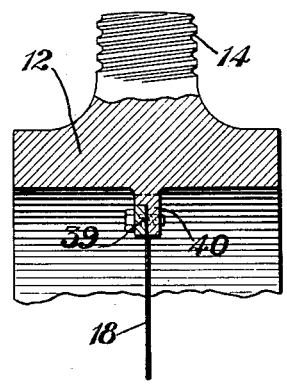
Figure 4 is a section of Figure 3 at right angles thereto.

In Figures 3 and 4, we have shown another embodiment of our invention wherein the proving ring 12 is provided with opposite bosses 14 (only one of which is shown). Small projections 38 integral with ring 12 protrude within the ring along the axis through the bosses. These projections are cut away, as at 39, so as to leave a fin 40 to which the vibrating reed 18 and the micrometer are attached, as in Figures 1 and 2.

In order to prevent the stresses from being transmitted to the fin 40 when the proving ring is under load, a slit or kerf 41 is provided on the projection 38 adjacent the inner surface of the ring 12 and on each side of the longitudinal axis of the reed.

Figure 5:
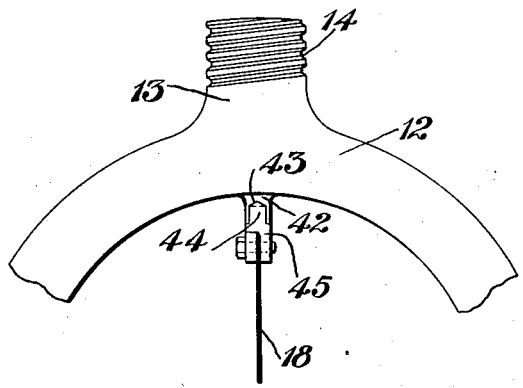
Figure 5 shows another modification of our proving ring.
Figure 6:
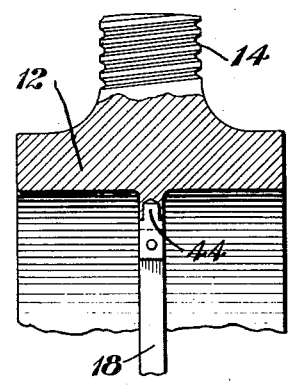
Figure 6 is a section of Figure 5 at right angles thereto.

In Figures 5 and 6, we have illustrated another way of mounting the reed and micrometer in the proving ring. Along the axis of the bosses 14, the proving ring 12 is provided with a small integral boss 42, hollowed out, as at 43, to accommodate a stem 44 having a drive fit therein. From stem 44 depends a fin 45 to which the vibrating reed 18 is mounted. It will be understood that there is a corresponding and similar mounting for the micrometer and that, as previously explained, the reed and the micrometer may be interchanged.

In Figures 7 to 9 is shown a further modification of our proving ring wherein the bosses 14 are provided with central cylindrical openings 46 extending therethrough to the inner surface of the ring 12. A stem member 47 having an enlarged head 48, drive-fitted in the opening 46 and located therein at the neutral axis of that portion of the ring.

The stem member 47 extends within the ring 12 and at its end is provided with a fin 49 to which the vibrating reed or micrometer is attached, as explained in connection with the previous figures.

In Figures 10 and 11, we have illustrated another method of attaching the means for measuring the deflection of our proving ring.

In these figures, the bosses 14 are provided with central cylindrical openings 50 and 51, respectively, of equal diameters, separated by a restricted opening or throat 52, so as to form the conical seats or shoulders 53 and 54. A stem member 55 extends into opening 51 and within the ring 12. The stem member 55 has a reduced threaded portion 56 extending through the throat 52 and this portion 56 receives a nut 57 provided with a conical seat to cooperate with the conical seat 53 on which it rests. At the junction of stem 55 and threaded portion 56 a conical seat is also formed to rest against the conical seat 54, so that when nut 57 is driven home, the stem member 55 will be securely held in, and practically made integral with, the material of the proving ring 12. A fin 58 is provided at the inner extremity of the stem 55 and the vibratory reed or the micrometer is fixedly secured to this fin, as previously explained.

By referring to Figure 10, wherein the neutral axis of the ring is indicated in dotted lines, it will be seen that the mounting of the stem member 55 is located substantially at the neutral axis for that portion of the ring, so that deflections of the ring for a certain load will be constant for that load.

The advantages of the above described attachments will be obvious, it being noted that there can not, under the usual service conditions, be any shift of the position of the attachment with respect to the ring.

The measuring device can be attached securely to an integral portion of the ring and this portion of the ring is so far from the portions which are stressed when loads are applied that they are practically unaffected by stress. The readings obtained under such conditions are readings of the deflection of the ring.

It has been found, further, that due to the provision of the bosses 14 integral with the ring and to which the loads are directly applied, a substantial error caused by the manner in which the load was applied in our aforementioned invention, has been eliminated.

It is to be understood throughout the foregoing specification and the following claims that by the term "ring" we do not necessarily imply a circular band whose end view would be bounded by two true circles, as it will be appreciated that the bounding curves of the end view may just as well be oval or elliptical or the like without causing any disadvantageous changes in the results obtainable with our ring. The main requisite is that the ring be continuous.

Having thus described our invention, what we claim as new and desire to secure by Letters Patent is:

1. In combination, an elastic ring adapted to be deformed, integral bosses on said ring protruding outwardly therefrom along a common axis, said bosses being adapted to directly receive a load, and means for measuring the deflection of the ring due to the load.

2. In combination, an elastic ring adapted to be deformed, integral bosses on said ring protruding outwardly therefrom along a common axis through the center of the ring, said bosses being adapted to directly receive a load, means for measuring the deflection of the ring due to the load, and means mounting said measuring means on the ring at points where the stress is substantially zero irrespective of the stress in any portion of the ring.

3. In combination, an elastic ring adapted to be deformed, integral projections on said ring protruding inwardly thereof along a common axis through the center of the ring, said ring having an annular recess surrounding each projection for preventing the stresses in the ring due to a load from being transmitted to the said projections, and means for measuring the deflection of the ring attached directly to said projections.

4. In combination, an elastic ring adapted to be deformed, integral bosses protruding outwardly from said ring, integral projections protruding inwardly of said ring, said bosses being adapted to receive a load, and means for measuring the deflection of the ring due to the load, said means being carried by the aforementioned projections.

5. In a proving ring adapted to receive a load, means for measuring the corresponding deflection of the ring, projections structurally integral with the ring and extending inwardly thereof along a common diameter, said measuring means comprising a vibratory reed carried by one of said projections and a micrometer carried by the other of said projections.

6. In a standardized proving ring, a ring having projections structurally integral therewith, cooperating micrometer means, and means for mounting said micrometer means on said projections, said means being located along a diametrical axis of said ring and half way between the longitudinal confines thereof.

7. In combination, an elastic ring adapted to be deformed, integral bosses on said ring protruding outwardly therefrom along a common axis, a micrometer, and means for mounting the micrometer along the axis of the bosses.

8. In a standardized proving ring, a ring having projections structurally integral therewith, cooperating micrometer means, and means for mounting said micrometer means on said projections, said means being attached at the neutral surface thereof and along a diametrical axis of said ring.

9. In a standardized proving ring, a ring having projections structurally integral therewith, cooperating micrometer means, and means for mounting said micrometer means on the projections, said means being attached concurrently at the neutral surface of the ring, along a diametrical axis of the ring and half way between the longitudinal confines of the ring.

10. A proving ring having projections structurally integral therewith and adapted to receive loads, cooperating micrometer means for measuring the deflections of the ring under load, and means for attaching said micrometer means on said projections, said means being located at the neutral surface thereof and along the line of application of the loads.

11. In combination, an elastic ring adapted to be deformed, integral bosses on said ring protruding outwardly therefrom along a common axis, a micrometer, a reed cooperating therewith and means for mounting the micrometer and reed, respectively, at the neutral surface of the portions of the ring including each boss.

12. In combination, an elastic ring adapted to be deformed, integral bosses on said ring protruding outwardly therefrom along a common axis, a micrometer, a reed cooperating therewith and means for mounting the micrometer and reed, respectively, along the axis of the bosses and at the neutral surface of the portions of the ring including each boss.

13. In combination, an elastic ring adapted to be deformed under loads, projections structurally integral with the ring and extending inwardly thereof, means for measuring the deflections of the ring corresponding to the loads, and cooperating portions on said projections and said measuring means whereby the latter may be secured to the former.

14. In combination, an elastic ring adapted to be deformed under loads, integral projections on said ring protruding inwardly thereof, and means for measuring the deflections of the ring corresponding to the loads attached to said projections, there being a discontinuity of the material of the ring about said projections.

HERBERT L. WHITTEMORE.
SERGE N. PETRENKO.